Patented Dec. 21, 1948

2,456,722

UNITED STATES PATENT OFFICE 2,456,722

SELECTIVE COPPER SOLVENT FOR DIOLEFIN EXTRACTION

Charles E. Morrell, Westfield, and Miller W. Swaney, Cranford, N. J., assignors to Standard Oil Development Company, a corporation of Delaware No Drawing. Application December 29, 1945, Serial No. 638,518

5 Claims. (Cl. 260—681.5)

This invention relates to improvements in the separation of olefins from mixtures of hydrocarbons and relates particularly to improvements in the separation of olefins or diolefins from hydrocarbons having two or more carbon atoms to the molecule by the use of copper solvents.

The affinity of certain cuprous compounds for unsaturated hydrocarbons is well known. Thermally decomposable complexes are formed between the simple olefins and diolefins and cuprous compounds such as cuprous chloride, $CuCl.NH_4Cl$ complexes, etc. However, most of these cuprous compounds and complexes possess certain features such as corrosiveness to metal equipment which render them unsuited for use in the commercial recovery and separation of olefins and diolefins in hydrocarbon fractions.

The use of hydroxy amine complexes of copper for the separation of olefins from mixtures of hydrocarbons is suggested in the U. S. Patent 2,005,500, issued June 18, 1935, to Walter Philip Joshua and Herbert Muggleton Stanley. However, the hydroxy amine copper solutions are unstable on heating to temperatures of the order of 80° C., which are required for satisfactory desorption of the hydrocarbons from the solutions.

In U. S. application Serial No. 371,998, filed December 27, 1940, for C. E. Morrell and M. W. Swaney, is disclosed the efficacy of the ammoniacal cuprous acetate solutions of high cuprous content for the extraction and separation of butadiene from cracked hydrocarbons fractions. These solutions possess high solvency for butadiene, high specificity for butadiene over the butylenes, and high thermal stability in glass or in steel equipment. However, these ammoniacal cuprous acetate solutions possess considerably lower solvency for the higher diolefins such as isoprene, piperylene, etc.

According to this invention it is now discovered that if the ammonia in the ammoniacal cuprous acetate complexes is replaced by monomethylamine, in part or wholly, the resulting complex is very effective for the extraction and concentration of the higher diolefins such as isoprene from hydrocarbon mixtures. In addition, the basic monomethylamine cuprous acetate solutions retain remarkable thermal stability and are non-corrosive to metal equipment, for example, steel.

The superior features of the monomethylamine cuprous acetate solutions for the absorption and separation of diolefins from hydrocarbons are illustrated by the following examples, but this invention is not limited to the sphere of the operations cited.

Example 1

An ammoniacal cuprous acetate solution of high ammonia, acetate and copper contents was prepared containing 3.4 mols of cuprous copper per liter. This solution possessed the capacity to absorb about 25 gaseous volumes of pure butadiene at 0° C. per volume of solution. When brought to equilibrium at 0° C. however, with a liquid mixture containing 25% isoprene/75% trimethylethylene (2-methylbutene-2) and subsequently desorbed by heating followed by removal of ammonia and blending of the $C_5$ with nitrogen to facilitate analysis, it was found to have dissolved only 1.6 volumes of (gaseous) $C_5$ per volume of copper solution, the purity of the isoprene desorbate being 78%, or the equivalent of 0.36 liters of isoprene vapor/mol of cuprous complex.

Example 2

A methylamine-cuprous acetate complex solution containing approximately 16 molar methylamine, 3 molar acetate, and 1.24 molar total copper (1.0 molar cuprous) contents was brought to equilibrium with a blend of 24% isoprene-76% pentene-1 at 0° C. In order to demonstrate the superiority of this methylamine solution, pentene-1 was employed as the $C_5$ diluent rather than trimethylethylene of Example 1, since the former (pentene-1) is approximately ten times as soluble in these copper solutions as the latter (trimethylethylene) and therefore pentene 1 is far more difficult to separate from isoprene. Under the above extraction conditions the methylamine-cuprous acetate solution absorbed 4.5 volumes of gaseous $C_5$ of 63% isoprene content per volume of copper solution employed. In terms of pure isoprene vapor this is equivalent to an absorption of 2.8 liters of $C_5$ gas/mol of cuprous complex. Therefore, the methylamine solution was approximately 8 times as efficient as the ammoniacal complex for absorbing isoprene. The monomethylamine cuprous acetate solution employed in this example possessed a very high thermal stability under confinement and was non-corrosive to steel.

The process herein cited may also be applied to other mixtures of diolefins and to other cuprous salt solutions. It is particularly adapted for separating unsaturated hydrocarbons, such as ethylene, propylene, butene-1, butene-2, isobutylene, allene, butadiene, isoprene, piperylene, etc., dimethylbutadiene, and the methyl pentadienes from a relatively more saturated hydrocarbon.

The other cuprous salts that may be used with methylamine are cuprous chloride, sulfate, formate, propionate, lactate, tartrate, etc., for the extraction of an olefin or diolefin from a mixture of olefins having the same number of carbon atoms to the molecule. The alkylamines that may be used are: primary aliphatic amines of 1–4 carbon atoms which are preferred, though secondary and tertiary amines are also included.

The mol ratio of amine to acetate that may be used varies from 1.5 to 7; 2.0 to 3.5 being preferred. The water content that may be used varies from 0 to 20 mols per liter; 1.5 to 7 mols per liter being preferred. The cuprous content is between about 1.0 to 2.5 mols per liter, preferably between 1.5 to 2.0 mols per liter. The presence of some cupric copper is desirable to the solution stability and a pH above about 10 is desirable.

The extraction with these solutions may be carried out most conveniently at temperatures just above the freezing points of the solutions saturated with olefin which are usually below 0° C. When the higher extraction temperatures are employed the operations may be carried out under applied pressure to prevent loss of amine.

Regeneration is carried out conveniently around 50–80° C. using a diluent gas, though no diluent gas other than the amine is needed, and higher or lower desorption temperatures may be used under appropriate pressures.

Hence, monomethylamine cuprous acetate solutions offer most promise for concentrating isoprene produced by catalytic dehydrogenation of trimethylethylene but are also applicable for treatment of $C_5$ fractions obtained by thermal and catalytic cracking of heavier hydrocarbons.

What is claimed is:

1. A process for separating a $C_5$ diolefin from a $C_5$ mono-olefin in a mixture thereof which comprises selectively absorbing the $C_5$ diolefin in an alkyl amine cuprous salt complex solution having a pH value above about 10, leaving the $C_5$ mono-olefin undissolved by said solution freed of the absorbed $C_5$ diolefin.

2. The process for separating a $C_5$ diolefin from a $C_5$ mono-olefin in a mixture thereof which comprises absorbing principally the diolefin in an aqueous solution of a primary alkyl amine cuprous salt complex in which the alkyl amine has from 1 to 4 carbon atoms per molecule, said solution having a pH value above about 10, separating the resulting solution of the absorbed diolefin from the remaining mixture of concentrated $C_5$ mono-olefin, and desorbing the $C_5$ diolefin from the thus separated solution.

3. A process as described in claim 2, in which the diolefin is isoprene and the alkyl amine is mono-methylamine.

4. The process as described in claim 2, in which the $C_5$ diolefin is piperylene.

5. The process of separating isoprene from pentene-1 in a hydrocarbon mixture thereof which comprises selectively extracting said isoprene in a mono-methylamine-cuprous acetate complex solution at a temperature range from the freezing point of the solution up to about 0° C., said solution having a 1.0 to 2.5 molar cuprous content with a mol ratio of 2.0 to 3.5 of the amone to 1 mol of acetate, separating said solution containing the extracted isoprene from the hydrocarbon mixture, and desorbing the isoprene from the solution.

CHARLES E. MORRELL.
MILLER W. SWANEY.

REFERENCES CITED

The following references are of record in the file of this patent:

UNITED STATES PATENTS

| Number | Name | Date |
| --- | --- | --- |
| 2,245,719 | Robey | June 17, 1941 |
| 2,275,135 | Fasce | Mar. 3, 1942 |
| 2,369,559 | Gilliland | Feb. 13, 1945 |
| 2,376,239 | Evans et al. | May 15, 1945 |
| 2,381,311 | Robey et al. | Aug. 7, 1945 |
| 2,388,928 | Morrell et al. | Nov. 13, 1945 |
| 2,401,896 | Asbury et al. | June 11, 1946 |